United States Patent
Ahn et al.

(10) Patent No.: US 7,829,629 B2
(45) Date of Patent: *Nov. 9, 2010

(54) FLAME RETARDANT POLYMER COMPOSITION

(75) Inventors: Sung Hee Ahn, Seoul (KR); Jae Ho Yang, Gunpo-si (KR); Sang Hyun Hong, Gunpo-Si (KR); Su Hak Bae, Seoul (KR); Young Sik Ryu, Anyang-si (KR)

(73) Assignee: Cheil Industries Inc., Gyungsangbuk-do (KR)

( * ) Notice: Subject to any disclaimer, the term of this patent is extended or adjusted under 35 U.S.C. 154(b) by 1272 days.

This patent is subject to a terminal disclaimer.

(21) Appl. No.: 11/348,293

(22) Filed: Feb. 6, 2006

(65) Prior Publication Data

US 2006/0183825 A1    Aug. 17, 2006

Related U.S. Application Data

(63) Continuation-in-part of application No. PCT/KR2004/001732, filed on Jul. 13, 2004.

(30) Foreign Application Priority Data

Aug. 4, 2003    (KR) .................. 10-2003-0053858

(51) Int. Cl.
*C08K 5/49*    (2006.01)
(52) U.S. Cl. .................. 524/710; 524/508; 524/583; 526/328; 526/329.3; 526/329.2; 526/335
(58) Field of Classification Search .................. 526/329, 526/329.3, 329.2, 335; 524/508, 583, 710
See application file for complete search history.

(56) References Cited

U.S. PATENT DOCUMENTS

| | | | |
|---|---|---|---|
| 3,849,368 A | 11/1974 | Anderson et al. | |
| 4,273,881 A | 6/1981 | Otten | |
| 4,459,381 A | 7/1984 | Trivedi | |
| 4,618,633 A | 10/1986 | Taubitz | |
| 4,632,946 A | 12/1986 | Muench | |
| 5,030,674 A | 7/1991 | Notorgiacomo | |
| 6,054,515 A | 4/2000 | Blount | |
| 6,306,941 B1 | 10/2001 | Klatt et al. | |
| 2006/0183825 A1 | 8/2006 | Hong et al. | |
| 2006/0183826 A1 | 8/2006 | Ryu et al. | |
| 2006/0189729 A1 | 8/2006 | Bae et al. | |
| 2006/0189730 A1 | 8/2006 | Hong et al. | |

FOREIGN PATENT DOCUMENTS

| | | | |
|---|---|---|---|
| DE | 42 09 029 A1 | | 9/1993 |
| DE | 19 637 368 | | 3/1998 |
| EP | 0 075 863 | * | 4/1983 |
| EP | 1 069 157 A1 | | 7/2001 |
| EP | 1 262 519 | | 12/2002 |
| GB | 2 003 888 | | 3/1979 |
| JP | 61009450 | | 1/1986 |
| KR | 2001-0009845 A | | 2/2001 |
| KR | 2003-0078189 A | | 10/2003 |
| KR | 2004-0003563 A | | 1/2004 |
| KR | 2004-0027104 A | | 4/2004 |
| KR | 2004-0058773 A | | 7/2004 |
| WO | WO 2004 029143 | | 4/2004 |

OTHER PUBLICATIONS

Abstract of DE 4209029 published Sep. 23, 1993.
Supplemental European Search Report completed Aug. 7, 2006.
Abstract XP002393756 which relates to Abstract of JP 61009450 published Jan. 17, 1986.
Abstract of JP 61009450 published Jan. 17, 1986.
European Search Report for related application completed Mar. 12, 2007 with Annex.
Co-pending U.S. Appl. No. 11/416,870, filed May 2, 2006, titled Flame Retardant Polymer Composition, and assigned to the assignee of this application.
Partial International Search Report dated Oct. 29, 2004 for International Application No. PCT/KR2004/001732, filed Jul. 13, 2004.

* cited by examiner

*Primary Examiner*—Ling-Siu Choi
(74) *Attorney, Agent, or Firm*—Maria Parrish Tungol

(57) ABSTRACT

A polymer composition includes a rubber modified vinyl resin, a polyphenylene ether resin, a cyclic alkyl phosphate compound, and an aromatic phosphate ester. In some embodiments, the cyclic alkyl phosphate compound is able to impart good flame retardancy to the composition and thermal resistance to the polymer composition.

14 Claims, No Drawings

FLAME RETARDANT POLYMER COMPOSITION

CROSS-REFERENCE TO RELATED APPLICATIONS

This application is a continuation-in-part application under 35 U.S.C. §365 (c) claiming the benefit of the filing date of PCT Application No. PCT/KR2004/001732 designating the United States, filed Jul. 13, 2004. The PCT Application was published in English as WO 2005/012418 A1 on Feb. 10, 2005, and claims the benefit of the earlier filing date of Korean Patent Application No. 10-2003-0053858, filed Aug. 4, 2003. The contents of the PCT Application including its international publication and Korean Patent Application No. 10-2003-0053858 are incorporated herein by reference in their entirety.

BACKGROUND

1. Field of the Invention

The invention relates to a flame retardant polymer composition. More particularly, they relate to a polymer composition comprising a rubber modified aromatic vinyl resin, a polyphenylene ether resin, and a cyclic phosphate ester compound.

2. Description of the Related Technology

Thermoplastic resin blends are commonly used in electronic and non-electronic devices. Researchers have tried to achieve resins that have good heat resistance, impact strength, dimensional stability, and thermal stability. Polyphenylene ether resins have many of these qualities; however it has poor processability. To improve its processability, polyphenylene ether resins may be blended with styrene resins. While imparting better processabilitty, this combination typically results in reduced impact strength. Attempts to further improve the impact strength in such compositions have been made. However, they usually result in the deterioration of surface gloss and processability.

Flame retardant thermoplastic resin blends are required in some electronic products. One method used to make a resin flame retardant is by the addition of halogenated compounds. The inclusion of a halogenated compounds for flame retardancy may make the resin toxic. Therefore, non-halogenated compounds for use as flame retardants are desirable.

SUMMARY OF THE INVENTION

According to some embodiments, there is a polymer composition comprising a rubber modified vinyl resin comprising, a polyphenylene ether resin; an aromatic phosphate ester compound and a cyclic phosphate ester compound represented by Formula (I):

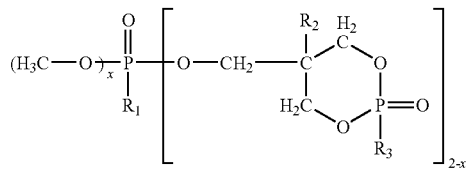

In the formula, $R_1$, $R_2$, and $R_3$ are independently selected from the group consisting of $C_1$-$C_{20}$ alkyl, substituted $C_1$-$C_{20}$ alkyl, $C_1$-$C_{20}$ alkenyl, substituted $C_1$-$C_{20}$ alkenyl, $C_1$-$C_{20}$ alkynyl, substituted $C_1$-$C_{20}$ alkynyl, $C_6$-$C_{30}$ aryl, substituted $C_6$-$C_{30}$ aryl, $C_6$-$C_{30}$ arylalkyl, substituted $C_6$-$C_{30}$ arylalkyl, $C_1$-$C_{30}$ heteroalkyl, substituted $C_1$-$C_{30}$ heteroalkyl, $C_6$-$C_{30}$ heteroaryl, substituted $C_6$-$C_{30}$ heteroaryl, $C_6$-$C_{30}$ hetero arylalkyl, substituted $C_6$-$C_{30}$ hetero arylalkyl. Also in some embodiments, x is an integer of 0 to 1

In some embodiments, the polymer composition comprises about 20 to about 90 parts by weight of an rubber modified vinyl resin, about 10 to about 80 parts by weight of a polyphenylene ether resin, about 0.1 to about 30 parts by weight of a cyclic phosphate ester compound based on the rubber modified vinyl resin and the polyphenylene ether resin totaling 100 parts by weight, and about 0 to about 25 parts by weight of an aromatic phosphate ester based on the rubber modified vinyl resin and the polyphenylene ether resin totaling 100 parts by weight.

In some embodiments, the aromatic phosphate ester compound is represented by the following formula (II):

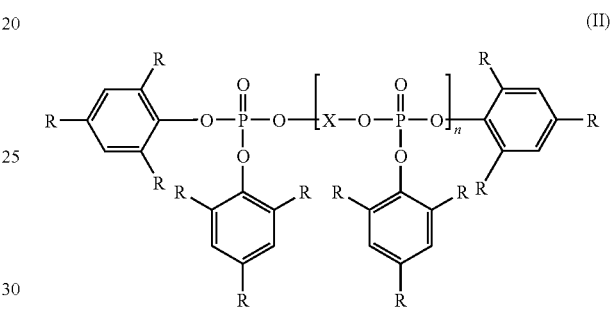

In the formula, R is independently hydrogen or $C_{1-4}$ alkyl, X is derived from a compound comprising two hydroxyaryl groups; and n is an integer of 0, 1, 2, 3, or 4. In some embodiments, the compound comprising two hydroxyaryl groups is selected from the group consisting of resorcinol, hydroquinone, bisphenol-A, and combinations thereof. In other embodiments, X comprises an arylene or multiple aryl groups.

In some embodiments, the rubber modified vinyl resin is a rubber modified styrenic resin. The rubber modified vinyl resin according to various embodiments comprises a copolymer having a repeating unit of at least two selected from a rubber, an aromatic mono-alkenyl monomer, and an alkyl ester monomer.

In some embodiments of the polymer composition, the polyphenylene ether resin is selected from the group consisting of poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, poly(2,3,5-triethyl-1,4-phenylene) ether and copolymers thereof.

In embodiments, a cyclic phosphate ester compound is methyl-bis (5-ethyl-2-methyl-1,3,2-dioxaphorinan-5-yl) methyl methyl phosphonic acid ester P-oxide or methyl-bis (5-ethyl-2-methyl-1,3,2-dioxaphorinan-5-yl) phosphonic acid ester P,P'-dioxide.

Embodiments also relate to the polymer composition in the form of a shaped article. In some embodiments, the article has a flame retardancy of V-0 when a specimen of the article is tested under the standard UL-94VB (⅛"). Additionally, the article may have a Vicat Softening Temperature of greater than or equal to about 86° C. when a specimen of the article is tested under the standard ASTM D-1525 under a 5 kg load. In other embodiments, the article has a Vicat Softening Temperature greater than or equal to about 92° C. when a specimen of the article is tested under the standard ASTM D-1525 under a 5 kg load.

Another embodiment is an electronic device comprising an electrical circuit; and a housing enclosing at least part of the electrical circuit, the housing comprising a portion, which comprises the molding composition of various embodiments as described herein. The the portion of the electronic device may have a flame retardancy of V-0 when tested under the standard UL-94VB (⅛") according to some embodiments. The portion may also have a Vicat Softening Temperature of greater than or equal to about 86° C. when tested under the standard ASTM D-1525 under a 5 kg load. In some embodiments, the portion has a Vicat Softening Temperature of greater than or equal to about 92° C. when tested under the standard ASTM D-1525 under a 5 kg load.

Another embodiment is a method of making an electronic device, comprising providing an electrical circuit, providing a housing comprising a portion; and enclosing at least part of the electrical circuit with the housing; wherein the portion comprises the composition according to various embodiments as described herin.

DETAILED DESCRIPTION OF EMBODIMENTS

As noted above, one aspect of this invention relates to a polymer composition. According to various embodiments, the polymer composition comprises a rubber-modified vinyl resin, a polyphenylene ether resin, and a cyclic alkyl phosphate compound. Additionally, some embodiments also comprise an aromatic phosphate ester compound as described below. Molded articles comprising the polymer compositions of the embodiments show enhanced physical or mechanical properties as compared to other compositions less one or more components. The molded articles of the embodiments also demonstrate improved flame retardancy and Vicat Softening Temperature over compositions less one or more components. As will be discussed, the molded articles according to embodiments of the invention have good flame retardancy and thermal stability, while maintaining a good balance of other physical and mechanical properties.

In one embodiment, the flame retardant polymer composition can comprise a rubber modified vinyl resin, a polyphenylene ether resin, and a cyclic alkyl phosphate compound. One embodiment includes a cyclic alkyl phosphate compound having the following formula (I):

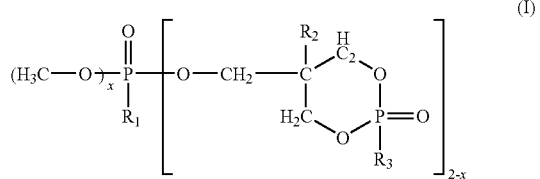

In the formula, $R_1$, $R_2$, or $R_3$ are independently selected from the group consisting of $C_1$-$C_{20}$ alkyl, substituted $C_1$-$C_{20}$ alkyl, $C_1$-$C_{20}$ alkenyl, substituted $C_1$-$C_{20}$ alkenyl, $C_1$-$C_{20}$ alkynyl, substituted $C_1$-$C_{20}$ alkynyl, $C_6$-$C_{30}$ aryl, substituted $C_6$-$C_{30}$ aryl, $C_6$-$C_{30}$ arylalkyl, substituted $C_6$-$C_{30}$ arylalkyl, $C_1$-$C_{30}$ heteroalkyl, substituted $C_1$-$C_{30}$ heteroalkyl, $C_6$-$C_{30}$ heteroaryl, substituted $C_6$-$C_{30}$ heteroaryl, $C_6$-$C_{30}$ hetero arylalkyl, substituted $C_6$-$C_{30}$ hetero arylalkyl.

In some embodiments of compositions comprising the cyclic phosphate ester of Formula (I), x is an integer of 0 or 1.

Additionally some embodiments may further comprise (D) about 0 to about 25 parts by weight of an aromatic phosphate ester compound, per 100 parts by weight of the sum of (A) and (B). The aromatic phosphate ester compound can be represented by the following formula in certain embodiment:

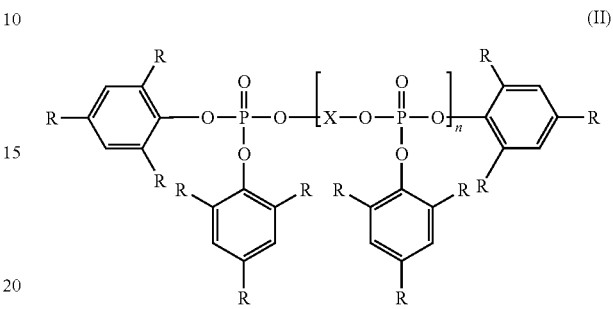

In some embodiments, each R is independently hydrogen or $C_{1-4}$ alkyl. For example, R can be selected from methyl, ethyl, propyl, isopropyl, butyl, sec-butyl, and tert-butyl. In other embodiments, the alkyl group may be substituted with a halogen, an alkene group, or an alkyne group. Each R may be selected independently from another R on the same or a different phenyl ring.

In certain embodiments, X is derived from a compound comprising two hydroxyaryl groups, and n is an integer 0, 1, 2, 3 or 4.

These components are further described here.

Rubber Modified Vinyl Resin

In some embodiments, the rubber modified vinyl resin is a copolymer of (a) at least one rubber monomer and (b) at least one aromatic mono-alkenyl monomer. In other embodiments, the rubber modified vinyl resin is a copolymer of (a) at least one rubber monomer and (c) at least one alkyl ester monomer of acrylic acid or methacrylic acid. Further, in some embodiments, the rubber modified vinyl resin is a copolymer of (a) at least one rubber monomer, (b) at least one aromatic mono-alkenyl monomer; and (c) at least one alkyl ester monomer of acrylic acid or methacrylic acid.

According to some embodiments, the rubber modified vinyl resin is a copolymer comprising a rubber monomer repeating unit. To this repeating unit, another vinyl repeating unit is covalently bound. In some embodiments, this vinyl repeating unit is that of an aromatic mono-alkenyl monomer. In other embodiments, it is an alkyl ester monomer repeating unit. Still, in further embodiments, the rubber modified vinyl resin comprises a repeating unit of a rubber monomer, a repeating unit of an aromatic mono-alkenyl monomer, and a repeating unit of an alkyl ester monomer. However, for each repeating unit, more than one type of repeating unit can exist. For example, there may be mixtures of rubber monomer repeating units, and aromatic mono-alkenyl repeating units in the same copolymer. One example is a copolymer which contains a butadiene core copolymerized with a styrene repeating unit and a methyl substituted styrene repeating unit.

In certain embodiments, the rubber which can be used include butadiene rubbers, isoprene rubbers, styrene-butadiene copolymers and alkylacrylic rubbers. The amount of the rubber that can be used in some embodiments is about 0 to about 30 parts by weight, preferably about 0 to about 15 parts by weight. In other embodiments, the rubber can be in the amount of about 0, 1, 2, 3, 4, 5, 6, 7, 8, 9, 10, 11, 12, 13, 14, 15, 18, 21, 24, 27, and 30 parts by weight.

In embodiments, the rubber modified vinyl resin comprises one or more monomer repeating units selected from the group consisting of aromatic mono-alkenyl monomer and/or alkyl ester monomers of acrylic acid or methacrylic acid. In certain embodiments, the amount of the monomers is about 70 to about 100 parts by weight, preferably about 85 to about 97 parts by weight. In other embodiments, the amount of the monomers that can be used to make the copolymer can be about 70, 72, 74, 76, 78, 80, 82, 84, 86, 88, 90, 92, 94, 96 and 98 parts by weight.

In some embodiments, the rubber-modified vinyl resin can be prepared by blending a rubber monomer, an aromatic mono-alkenyl monomer and/or alkyl ester monomer and polymerizing with heat or a polymerization initiator. The rubber-modified vinyl resin can be produced by a known polymerization method such as bulk polymerization, suspension polymerization, emulsion polymerization or combination thereof. Among them, bulk polymerization is preferred. The resin composition can be polymerized with heat or a polymerization initiator. The polymerization initiator may be one or more selected from the group consisting of organic peroxides such as benzoyl peroxide, t-butyl hydroperoxide, acetyl peroxide and cumene hydroperoxide or azo compounds such as azobisisobutyronitrile (AIBN).

To acquire the optimum physical properties of a blend of rubber-modified vinyl resin and polyphenylene ether, the average size of rubber particles is preferably in the range of from about 0.1 to about 6.0 μm (z-average), more preferably about 0.25 to about 3.5 μm (z-average). In some embodiments, the rubber-modified vinyl resin is a rubber modified aromatic resin, but has all of the general properties as those described herein for rubber modified vinyl resins. In one embodiment, the rubber modified vinyl resin is a rubber modified styrenic resin or a rubber modified styrene containing resin. In some embodiments, the rubber modified vinyl resins may be used as a single resin or in combination with other resins as a mixture.

"Vinyl" as used herein is a broad term that is to be interpreted according to its ordinary definition. Because a vinyl group would become incorporated into the polymer upon polymerization, the polymer may not contain an alkene. Rather, the polymer would contain the repeating unit of a vinyl resin. Vinyl encompasses styrenic resins and other aromatic vinyl resins. In addition, vinyl encompasses acrylic and methacrylic resins. Some embodiments relate to rubber modified styrenic resins formed by the use of styrenic monomers. As such, all features described herein which apply to a rubber modified vinyl resin also apply to a rubber modified aromatic vinyl resins, rubber modified styrene containing resins, rubber modified acrylic containing resins, and so forth.

In some embodiments, the polymer composition comprises about 20, 22, 24, 26, 28, 30, 32, 34, 36, 38, 40, 42, 44, 46, 48, 50, 52, 54, 56, 58, 60, 62, 64, 66, 68, 70, 72, 74, 76, 78, 80, 82, 84, 86, 88, and 90 parts by weight of the rubber modified vinyl resin. Still, other embodiments comprise about 5, 10, 12, 14, 16, 18 parts by weight of the rubber modified vinyl resin. And in a few embodiments, the polymer composition comprises greater than 90 parts by weight of the rubber modified vinyl resin, including about 91, 92, 93, 94, 95, 96, 97, 98, 99, 99.5, and 99.9 parts by weight of the polymer composition.

Polyphenylene Ether (PPE)

Polyphenylene ether has been extensively used due to its superiority in its mechanical properties, electrical properties and heat resistance and further superiority in its dimensional stability. Additionally, the polyphenylene ether may also improve the flame retardancy of the rubber modified vinyl resin. In embodiments, polyphenylene ether may be a homopolymer and/or a copolymer comprising a structural unit of the following Formula:

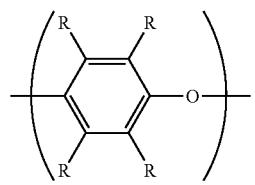

In the formula, R may independently comprises one or more of the group selected from hydrogen, halogen, alkyl, aryl, substituted alkyl, substituted aryl, hydrocarbyloxy, and alkoxy. However, the polyphenylene ether is not limited to only these embodiments, and a person having ordinary skill in the art would understand many different variations of a polyphenylene ether resin.

Examples of the polyphenylene ether resin include poly(2, 6-dimethyl-1,4-phenylene)ether, poly(2,6-diethyl-1,4-phenylene)ether, poly(2,6-dipropyl-1,4-phenylene)ether, poly (2-methyl-6-ethyl-1,4-phenylene)ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, and copolymer of poly(2,6-dimethyl-1,4-pheylene) ether and poly(2,3,5-triethyl-1,4-phenylene) ether. In embodiments, copolymer of poly(2,6-dimethyl-1,4-phenylene) ether and poly(2,3,6-trimethyl-1,4-phenylene) ether, and poly(2,6-dimethyl-1,4-phenylene) ether are used, and preferably poly(2,6-dimethyl-1, 4-phenylene) ether is used.

A mixture of two or more polyphenylene ethers may also be used in some embodiments. The degree of polymerization of polyphenylene ether is not limited specifically. However, it is preferable that the viscosity of polypheylene ether or the combination of the each polyphenylene ether in the mixture is in the range of about 0.2 to 0.8 g/dl measured in chloroform solvent at 25° C. However, this is merely a preferred range, and some embodiments may extend beyond this range.

In embodiments, the base resin is composed of about 20 to about 90 parts by weight of the rubber-modified polystyrene resin (A) and about 10 to about 80 parts by weight of the polyphenylene ether resin (B). In other embodiments, the base resin is composed of about 60 to about 75 parts by weight of the rubber-modified polystyrene resin (A) and about 25 to about 40 parts by weight of the polyphenylene ether resin (B).

Some of these embodiments of the polymer composition comprise about 10, 12, 14, 16, 18, 20, 22, 24, 26, 28, 30, 32, 34, 36, 38, 40, 42, 44, 46, 48, 50, 52, 54, 56, 58, 60, 62, 64, 66, 68, 70, 72, 74, 76, and 80 parts by weight of a polyphenylene ether resin. Still, other embodments use less than about 10 parts by weight of the polyphenylene ether resin including 0.1, 0.5, 1, 1.5, 2, 2.5, 3, 3.5, 4, 4.5, 5, 5.5, 6, 6.5, 7, 7.5, 8, 8.5, 9, and 9.5 parts by weight. Other certain embodiments include about 82, 84, 86, 88, 90, 92, 94, 96, 98, and 99.9 parts by weight of the polyphenylene ether resin.

Cyclic Alkyl Phosphate Ester Compound

In certain embodiments, the rubber modified vinyl resin and the polyphenylene ether resin are used together with a cyclic alkyl phosphate compound. In some of these embodiments, the cyclic alkyl phosphate compound is represented by the following chemical Formula I:

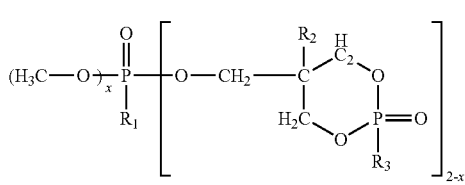

wherein $R_1$, $R_2$, and $R_3$ are independently selected from the group consisting of $C_1$-$C_{20}$ alkyl, substituted $C_1$-$C_{20}$ alkyl, $C_1$-$C_{20}$ alkenyl, substituted $C_1$-$C_{20}$ alkenyl, $C_1$-$C_{20}$ alkynyl, substituted $C_1$-$C_{20}$ alkynyl, $C_6$-$C_{30}$ aryl, substituted $C_6$-$C_{30}$ aryl, $C_6$-$C_{30}$ arylalkyl, substituted $C_6$-$C_{30}$ arylalkyl, $C_1$-$C_{30}$ heteroalkyl, substituted $C_1$-$C_{30}$ heteroalkyl, $C_6$-$C_{30}$ heteroaryl, substituted $C_6$-$C_{30}$ heteroaryl, $C_6$-$C_{30}$ hetero arylalkyl, substituted $C_6$-$C_{30}$ hetero arylalkyl; and x is and integer of 0 or 1.

In some embodiments, $R_1$, $R_2$, or $R_3$ can comprise an alkyl group from $C_1$-$C_{20}$ alkyl comprising methyl, ethyl, propyl such as n- or isopropyl, butyl such as n-, iso-, sec- and tert-butyl, pentyl, hexyl, heptyl, octyl, nonyl, decyl, undecyl, dodecyl, tridecyl, tetradecyl, pentadecyl, hexadecyl, heptadecyl, and octadecyl. Some embodiments may also comprise alkoxy, for example methoxy, ethoxy, propoxy, isopropoxy, n-butoxy, isobutoxy, pentyloxy, isopentyloxy, hexyloxy, heptyloxy, octyloxy, decyloxy, tetradecyloxy, hexadecyloxy or octadecyloxy.

In some embodiments, $R_1$, $R_2$, or $R_3$ can comprise an alkenyl group from $C_1$-$C_{20}$ alkenyl comprising ethenyl, propenyl such as n- or isopropenyl, butyl such as n-, iso-, sec- and butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, and octadecenyl. In these embodiments, the double bond can be at any portion of the carbon chain $R_1$, $R_2$, or $R_3$ can also comprise alkyne groups in the alkyl groups including terminating and non-terminating alkyne groups.

In some embodiments, $R_1$, $R_2$, or $R_3$ can comprise arylalkyl or alkylaryl such as $C_7$-$C_{15}$ phenylalkyl. Other examples include, but are not limited to, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, or 2,6-diethylphenyl. In these embodiments, $R_1$, $R_2$, or $R_3$ groups may be bound through an aryl group or the alkyl group. In other embodiments, $R_1$, $R_2$, or $R_3$ can be heteroaryl, such as pyridyl. In other embodiments, $R_1$, $R_2$, or $R_3$ can be hetero alkylaryl such as, but not limited to, $C_7$-$C_{15}$ phenylalkoxy or other types of phenoxy groups including methyl phenoxy and so forth.

"Substituted" means that the base organic radical has one or more substituents. For example, substituted cyclohexyl means a cyclohexyl radical that has one or more substituents. Substituents include, but are not limited to, halogen, $C_1$-$C_8$ alkyl, —CN, $CF_3$, —$NO_2$, —$NH_2$, —$NHC_1$-$C_8$ alkyl, —$N(C_1$-$C_8$ alkyl$)_2$, —OC 1-$C_8$ alkyl, and —OH. In some embodiments, substituents include, but are not limited to, tert-butyl, methyl, chlorine, fluorine, bromine, —$OCH_3$, —$OCH_2CH_3$, —OH, and —$N(CH_3)_2$.

"Hetero" is a broad term and is to be interpreted according to its ordinary definition. It includes, but is not limited to, a substituted of a carbon atom with a different type of atom, including, but not limited to oxygen, nitrogen, phosphorous, sulfur, boron, and so forth.

Examples of the cyclic alkyl phosphate ester compound having the structural formula (I) include methyl-bis(5-ethyl-2-methyl-1,3,2-dioxaphorinan-5-yl) methyl methyl phosphonic acid ester P-oxide, methyl-bis(5-ethyl-2-methyl-1,3,2-dioxaphorinan-5-yl) phosphonic acid ester P,P'-dioxide.

In some embodiments, the cyclic alkyl phosphate ester compound (C) is used in the amount of from about 0.1 to about 30 parts by weight 100 parts by weight of the base resin containing (A)+(B). In other embodiments, the cyclic alkyl phosphate ester compound is used in an amount about 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 parts by weight based on the weight of the base resin totaling 100 parts by weight. Still, other embodiments include less than 01. parts by weight of the cyclic alkyl phosphate ester including 0.1, 0.5, and 0.8 parts by weight. Other embodiments comprises about 32, 34, 36, 38, 40, 42, 44, 46, 48, 50, 52, 54, 56, 58, and 60 parts by weight of the cyclic alkyl phosphate ester.

Aromatic Phosphate Ester Compound

Some embodiments of the polymer composition additionally comprise an aromatic phosphate ester compound. In some of these embodiments, this compound has the following structural formula:

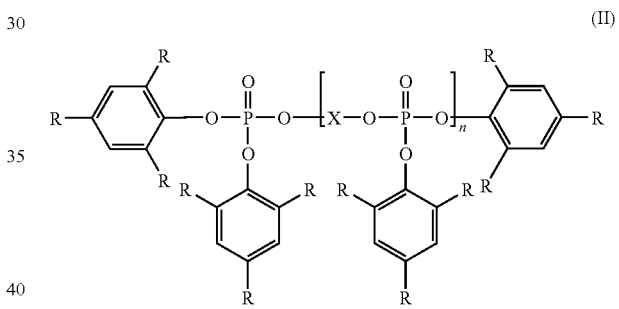

In some embodiments, each R is independently hydrogen or $C_{1-4}$ alkyl. For example, R can be selected from methyl, ethyl, propyl, isopropyl, butyl, sec-butyl. In other embodiments, the alkyl group may be substituted with a halogen, an alkene group, or an alkyne group. Each R may be selected independently from another R on the same or a different phenyl ring.

In certain embodiments, X is derived from a compound comprising two hydroxyaryl groups, and n is an integer 0, 1, 2, 3 or 4. For example, if X is derived from hydroquinone, then X would be a phenylene wherein a phenyl group would be disposed between the two oxygen atoms shown in the structural formula (as connected to X), and these oxygen atoms would be covalently bonded to the phenylene group in respective para positions. For another example, if X is derived from resorcinol, then X would be a phenylene wherein a phenyl group would be disposed between the two oxygen atoms shown in the structural formula (as connected to X), and these oxygen atoms would be covalently bonded to the phenylene group in respective meta positions. Other variations of this will be apparent to those having ordinary skill in the art. Thus, X can be derived from compounds such as hydroquinone, resorcinol, bisphenol A, naphthalene-2,6-diol, naphthalene-2,7-diol, and so forth. Thus, in some embodiments, X is arylene or multiple aryl groups.

Where n is 0, the compound represented in the structural formula is triphenyl phosphate, tricresyl phosphate, trixyrenyl phosphate, tri(2,6-dimethyl phenyl) phosphate, tri(2,4,6-trimethyl phenyl) phosphate, tri(2,4-ditertiary butyl phenyl) phosphate, tri(2,6-ditertiary butyl phenyl) phosphate, and the like, and where n is 1, the compounds include resorcinol bis(diphenyl) phosphate, resorcinol bis(2,6-dimethyl phenyl) phosphate, resorcinol bis(2,4-ditertiary butyl phenyl) phosphate, hydroquinone bis(2,6-dimethyl phenyl) phosphate, hydroquinone bis(2,4-ditertiary butyl phenyl) phosphate, and the like. In some embodiments, the compounds can be used alone or as a mixture of at least two of a compound conforming to the above formula.

In certain embodiments, the aromatic phosphate ester can be used in the amount of about 0 to about 25 parts by weight per 100 parts by weight of base resin, which is the combination of the rubber modified vinyl resin and the polyphenylene ether resin. In other embodiments, the aromatic phosphate ester can be used in an amount of about 4 to about 16 parts by weight based on 100 parts by weight of the base resin. Still in other embodiments, the aromatic phosphate ester is about 1, 2, 3, 4, 5, 6, 7, 8, 9, 10, 11, 12, 13, 14, 15, 16, 17, 18, 19, 20, 21, 22, 23, 24 and 25 parts by weight per 100 parts by weight of the base resin. Other embodiment can comprise about 0.3, 0.6, 0.8, 28, 30, 35, 40, 45, 50, 55, and 60 parts by weight of the aromatic phosphate ester based on the base resin of the rubber modified vinyl resin and the polyphenylene ether resin.

The polymer compositions can contain one or more compounds or polymers in addition to the foregoing components. Additional components or additives may be added to provide additional properties or characteristics to the molding composition or to modify existing properties of the composition. For example, an inorganic filler such as glass fiber, carbon fiber, talk, silica, mica, and alumina may be added to improve mechanical strength and heat distortion temperature of the resin composition. In addition, the polymer composition may further include a heat stabilizer, an anti-oxidant, an ultraviolet absorbing agent, a light stabilizer, a flame retardant, a lubricant, a pigment and/or dye. In these embodiments, additives are employed in an amount of 0 to 30 parts by weight as per 100 parts by weight of base resin. One of ordinary skill in the art will appreciate that various additives may be added to the polymer compositions according to embodiments of the invention.

Preparation of Embodiments of Compositions

The polymer compositions can be prepared by mixing components including a rubber-modified vinyl resin, a polyphenylene ether resin, and a cyclic alkyl phosphate compound. In some embodiments, one or more other additives may be mixed together with the components of the polymer composition. One or more component resins can be heated to melt prior to the mixing or the composition may be heated during the mixing. However, the mixing can occur when each components is in a solid, liquid, or dissolved state, or mixtures thereof. In one embodiment, the above components are mixed together all at once. Alternatively, one or more components are added individually. For example, the rubber modified vinyl resin may first be mixed with the cyclic alkyl phosphate compound, prior to mixing this admixture with additional components. Formulating and mixing the components may be made by any method known to those persons having ordinary skill in the art, or those methods that may be later discovered. The mixing may occur in a pre-mixing state in a device such as a ribbon blender, followed by further mixing in a Henschel mixer, Banbury mixer, a single screw extruder, a twin screw extruder, a multi screw extruder, or a cokneader.

In embodiments, the polymer composition may be prepared by any known method. For example, the inventive composition may be prepared by mixing the components of the compositions and other additives at the same time and melt-extruding the mixture through an extruder so as to prepare pellets. The mixture may also be molded into a a predetermined shape and cure to form a molded article.

Enhanced Properties

An advantage of certain embodiments is to provide a flame retardant thermoplastic resin composition with good flame retardancy by using a cyclic alkyl phosphate compound as a flame retardant to a rubber modified vinyl resin mixed with a polyphenylene ether resin. Another advantage of some embodiments is to provide a flame retardant thermoplastic resin composition with good properties, such as impact strength and heat resistance. In some embodiments, one advantage is to provide an environmentally friendly and non-toxic flame retardant thermoplastic resin composition which does not contain a halogen-containing compound.

Certain embodiments have an enhanced flame retardancy of V-0 when a specimen of the composition is tested under the standard UL-94VB with ⅛". These samples may be of the composition or of a formed articles comprising certain embodiments of the composition.

Some embodiments have Vicat Softening Temperature of at least about 86° C., more preferably at least about 88° C., and even more preferably about at least about 90° C., when a specimen of the composition is tested according to the standard ASTM D1525 under a 5 kg load. Certain preferred embodiments hav a Vicat Softening Temperature of at least about 92° C., more preferably at least about 94° C., and even more preferably at least about 96° C., when a specimen of the composition is tested according to the standard ASTM D1525 under a 5 kg load.

Shaped Articles of Electronic Devices

A shaped article can be made using the polymer composition according to the foregoing embodiments. In some embodiments, this article is molded into various shapes. For polymer with the composition, an extrusion molding machine such as a vented extruder may be used. The polymer composition of embodiments may be molded into various moldings using, for example, a melt-molding device. In embodiments, the polymer composition is formed into a pellet, which then may be molded into various shapes using, for example, injection molding, injection compression molding, extrusion molding, blow molding, pressing, vacuum forming or foaming. In one embodiment, the polymer composition can be made into a pellet using melt-kneading, and the resulting pellets are molded into moldings through injection molding or injection compression molding.

As noted, in one embodiment, the polymer compositions are formed into pellets. In other embodiments, the polymer compositions are formed into structural parts of various consumer products, including electronic devices and appliances. In some embodiments, the polymer compositions are molded into a housing or body of electronic or non-electronic devices. Examples of electrical devices, in which a molded article made of the blend of the composition according to embodiments of the invention are used, include printers, computers, word processors, keyboards, personal digital assistants (PDA), telephones, mobile phones, facsimile machines, copy machines, electronic cash registers (ECR), desk-top electronic calculators, PDAs, cards, stationery holders, washing machines, refrigerators, vacuum cleaners, microwave ovens, lighting equipment, irons, TV, VTR, DVD players, video cameras, radio cassette recorders, tape recorders, mini disc players, CD players, speakers, liquid crystal displays, MP3 players, and electric or electronic parts and telecommunication equipment, such as connectors, relays, condensers, switches, printed circuit boards materials, coil bobbins, semiconductor sealing materials, electric wires, cables, transformers, deflecting yokes, distribution boards, clocks, watches, and the like.

Another embodiment provides an electronic device which includes a housing or a part, which is made of a polymer composition comprising a rubber-modified vinyl resin, a polyphenylene ether resin, and a cyclic alkyl phosphate compound as described below. Some embodiments provide a method of making an electronic device, comprising providing an electrical circuit; providing a housing comprising a portion; and enclosing at least part of the electrical circuit with the housing, wherein the portion comprises the composition which comprises a rubber modified vinyl resin, a polyphenylene ether resin, and a cyclic alkyl phosphate compound as described below.

The invention is further described in terms of the following examples which are intended for the purpose of illustration and not to be construed as in any way limiting the scope of the present invention, which is defined by the claims. In the following examples, all parts and percentage are by weight unless otherwise indicated.

EXAMPLES

Preparation of the components of the polymer compositions of Examples 1-11 and Comparative Examples 1-4:

(A) Rubber Modified Polystyrene Resin ($a_1$) Rubber modified aromatic vinyl resin: High impact polystyrene of Cheil Industries Inc. of Korea (Product name: HR-1380F) was used. The particle size of butadiene rubber was 1.5 μm and the content of rubber was 6.5% by weight.

($a_2$) Styrenic resin: General purpose polystyrene (GPPS) of Cheil Industries Inc. (product name: HF-2680) with a weight average molecular weight of 210,000 was used.

(B) Polyphenylene Ether Resin (PPE)

($b_1$) Poly (2,6-dimethyl-phenyl ether) by Asahi Kasei Co. of Japan (product name: P-402) in the form of powder was used. The particles had the average size of several microns (μm).

($b_2$) Poly (2,6-dimethyl-phenyl ether) by GE (product name: HPP-820) in the form of powder was used. The particles had the average size of several microns (μm).

(C) Cyclic Phosphate Ester Compound

Antiblaze 1045 of Rhodia Co. which contains 20.8% of phosphorus [a mixture of 8% by weight of methyl-bis(5-ethyl-2-methyl-1,3,2-dioxaphorinan-5-yl) methyl methyl phosphonic acid ester P-oxide and 85% by weight of methyl-bis (5-ethyl-2-methyl-1,3,2-dioxaphorinan-5-yl) phosphonic acid ester P,P'-dioxide] was used.

(D) Aromatic Phosphate Ester Compound ($d_1$) Triphenylphosphate produced by Daihachi Chemical of Japan with a melting point of 48° C. was used.

($d_2$) Resorcinol bis (2,6-dimethylphenyl)phosphate produced by Daihachi Chemical of Japan (product name: PX200) was used.

($d_3$) Bisphenol-A diphosphate produced by Daihachi Chemical of Japan (product name: CR-741) was used.

($d_4$) Resorcinol diphosphate produced by Daihachi Chemical of Japan (product name: CR-733S) was used.

(E) Additives

Teflon (registered trademark) 7AJ by Dupont company was used.

Examples 1-11

The components as shown in Table 1 were mixed and the mixture was extruded at 200-280° C. with a conventional twin screw extruder in pellets. The resin pellets were dried at 80° C. for 3 hours, and molded into test specimens using a 6 oz injection molding machine at 180~280° C. and barrel temperature of 40-80° C. The flame retardancy of the test specimens was measured in accordance with UL94VB with a thickness of ⅛". The heat resistance was measured according to ASTM D-1525 under 5 kg. The test results are presented in Table 1.

TABLE 1

| | | Examples | | | | | | | | | | | Comparative Examples | | | |
|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 |
| (A) | ($a_1$) | 67 | 67 | 67 | 67 | 67 | 67 | 67 | 37 | 67 | 70 | 75 | 67 | 67 | 67 | 67 |
| | ($a_2$) | — | — | — | — | — | — | — | 30 | — | — | — | — | — | — | — |
| (B) | ($b_1$) | 33 | 33 | 33 | 33 | 33 | 33 | 33 | 33 | — | — | — | 33 | 33 | 33 | 33 |
| | ($b_2$) | — | — | — | — | — | — | — | — | 33 | 30 | 25 | — | — | — | — |
| (C) | | 3 | 3 | 3 | 3 | 5 | 10 | 15 | 3 | 3 | 4 | 5 | — | — | — | — |
| (D) | ($d_1$) | 9 | — | — | — | — | — | — | — | — | — | — | 12 | — | — | — |
| | ($d_2$) | — | 16 | — | — | 14 | 9 | 4 | 10 | 10 | 10 | 10 | — | 19 | — | — |
| | ($d_3$) | — | — | 17 | — | — | — | — | — | — | — | — | — | — | 20 | — |
| | ($d_4$) | — | — | — | 12 | — | — | — | — | — | — | — | — | — | — | 15 |
| (E) | | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| UL94 ⅛" | | V-0 | V-0 | V-0 | V-0 | V-0 | V-0 | V-0 | V-0 | V-0 | V-0 | V-0 | V-1 | V-1 | V-1 | V-1 |
| VST | | 87 | 86.5 | 86 | 86.5 | 88 | 92 | 96 | 94 | 94 | 90 | 86 | 83 | 84 | 83 | 83 |

As shown above, the resin compositions employing a cyclic phosphate compound and aromatic phosphate ester compound as a flame retardant demonstrated higher flame retardancy and heat resistance compared to those employing an aromatic phosphate ester compound alone. Thus, in some embodiments, a molded article comprising the composition can provide good physical properties when used in the production of electronic products including ultra-large-size thin films. Some embodiments have advantages in that they show excellent flame retardancy and thermal resistance while having a good balance of properties, such as impact resistance.

The skilled artisan will recognize the interchangeability of various features from different embodiments. Similarly, the various features and steps discussed above, as well as other known equivalents for each such feature or step, can be mixed and matched by one of ordinary skill in this art to perform compositions or methods in accordance with principles described herein. Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of embodiments herein. Rather, the scope of the present invention is to be interpreted with reference to the claims that Follow.

What is claimed is:

1. A composition comprising:
a rubber modified vinyl resin;
a polyphenylene ether resin;
a cyclic phosphate ester compound represented by Formula (I):

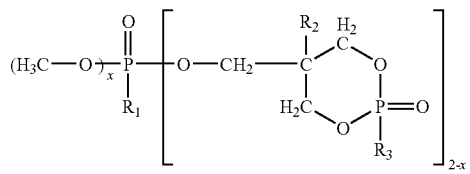

wherein $R_1$, $R_2$, and $R_3$ are independently selected from the group consisting of $C_1$-$C_{20}$ alkyl, substituted $C_1$-$C_{20}$ alkyl, $C_1$-$C_{20}$ alkenyl, substituted $C_1$-$C_{20}$ alkenyl, $C_1$-$C_{20}$ alkynyl, substituted $C_1$-$C_{20}$ alkynyl, $C_6$-$C_{30}$ aryl, substituted $C_6$-$C_{30}$ aryl, $C_6$-$C_{30}$ arylalkyl, substituted $C_6$-$C_{30}$ arylalkyl, $C_1$-$C_{30}$ heteroalkyl, substituted $C_1$-$C_{30}$ heteroalkyl, $C_6$-$C_{30}$ heteroaryl, substituted $C_6$-$C_{30}$ heteroaryl, $C_6$-$C_{30}$ hetero arylalkyl, and substituted $C_6$-$C_{30}$ hetero arylalkyl; and
wherein x is an integer of 0 to 1;
and optionally an aromatic phosphate ester compound;
and polytetrafluroethylene,
wherein the particle size of the rubber particles in the rubber modified vinyl resin is in the range from about 0.1 to about 6.0 μm (z-average).

2. The composition of claim 1, wherein the rubber modified vinyl resin is about 20 to about 90 parts by weight, the polyphenylene ether resin is about 10 to about 80 parts by weight, the cyclic phosphate ester compound is about 0.1 to about 30 parts by weight based on the rubber modified vinyl resin and the polyphenylene ether resin totaling 100 parts by weight, and the aromatic phosphate ester is about 0 to about 25 parts by weight based on the rubber modified vinyl resin and the polyphenylene ether resin totaling 100 parts by weight.

3. The composition of claim 1, wherein the aromatic phosphate ester compound is represented by the following formula (II):

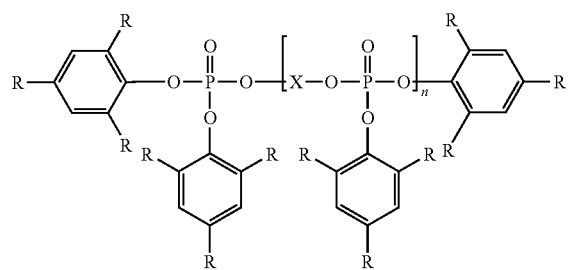

wherein R is independently hydrogen or $C_{1-4}$ alkyl;
wherein X is derived from a compound comprising two hydroxyaryl groups; and
wherein n is an integer of 0, 1, 2, 3, or 4.

4. The composition of claim 3, wherein the compound comprising two hydroxyaryl groups is selected from the group consisting of resorcinol, hydroquinone, bisphenol-A, and combinations thereof.

5. The composition of claim 3, wherein X comprises an arylene or multiple aryl groups.

6. The composition of claim 1, wherein the rubber modified vinyl resin is a rubber modified styrenic resin.

7. The composition of claim 1, wherein the rubber modified vinyl resin comprises copolymer having a repeating unit of at least two selected from a rubber, an aromatic mono-alkenyl monomer, and an alkyl ester monomer.

8. The composition of claim 1, wherein the polyphenylene ether resin is selected from the group consisting of poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene) ether, poly(2-ethyl-6-propyl-1,4-phenylene) ether, poly(2,6-diphenyl-1,4-phenylene) ether, copolymer of poly(2,6-dimethyl-1,4-phenylene) ether and poly(2,3,6-trimethyl-1,4-phenylene) ether, poly(2,3,5-triethyl-1,4-phenylene) ether and copolymers thereof.

9. The composition of claim 1, wherein said cyclic phosphate ester compound is methyl-bis (5-ethyl-2-methyl-1,3,2-dioxaphorinan-5-yl) methyl methyl phosphonic acid ester P-oxide or methyl-bis(5-ethyl-2-methyl-1,3,2-dioxaphorinan-5-yl) phosphonic acid ester P,P'-dioxide.

10. The composition of claim 1, formed in a shaped article.

11. The composition of claim 10, wherein the article has a flame retardancy of V-0 when a specimen of the article is tested under the standard UL-94VB (⅛").

12. The composition of claim 10, wherein the article has a Vicat Softening Temperature of greater than or equal to about 86° C. when a specimen of the article is tested under the standard ASTM D-1525 under a 5 kg load.

13. The composition of claim 10, wherein the article has a Vicat Softening Temperature greater than or equal to about 92° C. when a specimen of the article is tested under the standard ASTM D-1525 under a 5 kg load.

14. A composition comprising:
a rubber modified vinyl resin;
a polyphenylene ether resin;
a cyclic phosphate ester compound represented by Formula (I):

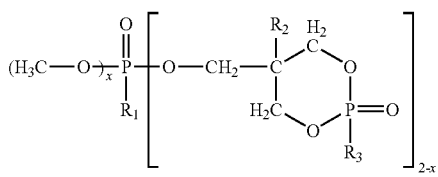

wherein $R_1$, $R_2$, and $R_3$ are independently selected from the group consisting of $C_1$-$C_{20}$ alkyl, substituted $C_1$-$C_{20}$ alkyl, $C_1$-$C_{20}$ alkenyl, substituted $C_1$-$C_{20}$ alkenyl, $C_1$-$C_{20}$ alkynyl, substituted $C_1$-$C_{20}$ alkynyl, $C_6$-$C_{30}$ aryl, substituted $C_6$-$C_{30}$ aryl, $C_6$-$C_{30}$ arylalkyl, substituted $C_6$-$C_{30}$ arylalkyl, $C_1$-$C_{30}$ heteroalkyl, substituted $C_1$-$C_{30}$ heteroalkyl, $C_6$-$C_{30}$ heteroaryl, substituted $C_6$-$C_{30}$ heteroaryl, $C_6$-$C_{30}$ hetero arylalkyl, and substituted $C_6$-$C_{30}$ hetero arylalkyl; and wherein x is an integer of 0 to 1;

and 0 parts of aromatic phosphate ester compound;

wherein the particle size of the rubber particles in the vinyl resin is in the range from about 0.1 to about 6.0 μm (z-average).

* * * * *